United States Patent
Santo et al.

(10) Patent No.: US 12,318,945 B2
(45) Date of Patent: Jun. 3, 2025

(54) ROBOT SYSTEM AND METHOD FOR PREDICTING LIFE OF REGENERATIVE RESISTOR

(71) Applicant: KAWASAKI JUKOGYO KABUSHIKI KAISHA, Kobe (JP)

(72) Inventors: Yoshiki Santo, Kobe (JP); Yasunori Oyama, Kobe (JP); Jun Kanzaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 236 days.

(21) Appl. No.: 18/019,015

(22) PCT Filed: Jul. 28, 2021

(86) PCT No.: PCT/JP2021/027941
§ 371 (c)(1),
(2) Date: Jan. 31, 2023

(87) PCT Pub. No.: WO2022/025130
PCT Pub. Date: Feb. 3, 2022

(65) Prior Publication Data
US 2023/0211502 A1 Jul. 6, 2023

(30) Foreign Application Priority Data
Jul. 31, 2020 (JP) .............................. 2020-130829

(51) Int. Cl.
*B25J 9/16* (2006.01)
*B25J 19/00* (2006.01)

(52) U.S. Cl.
CPC ......... *B25J 9/1674* (2013.01); *B25J 19/0008* (2013.01); *B25J 19/0054* (2013.01); *B25J 19/0066* (2013.01)

(58) Field of Classification Search
CPC ............... B25J 19/0008; B25J 19/0054; B25J 19/0066; B25J 9/1651; B25J 9/1664;
(Continued)

(56) References Cited

U.S. PATENT DOCUMENTS 4,035,692 A * 7/1977 Luy ........................ H02H 5/042
361/103
5,898,296 A * 4/1999 Maddox ................ H04M 19/00
318/629
(Continued)

FOREIGN PATENT DOCUMENTS

| JP | H06-015590 A | 1/1994 |
| JP | 2000-105605 A | 4/2000 |

(Continued)

OTHER PUBLICATIONS

Oct. 19, 2021 International Search Report issued in International Patent Application No. PCT/JP2021/027941.

*Primary Examiner* — Adam R Mott
*Assistant Examiner* — Sagar K C
(74) *Attorney, Agent, or Firm* — Oliff PLC

(57) ABSTRACT

A robot system includes a motor provided at a joint, a regenerative resistor that consumes a back electromotive force generated by rotation of the motor as heat, and a controller configured or programmed to predict a life of the regenerative resistor based on a period of time during which the regenerative resistor is consuming heat.

8 Claims, 3 Drawing Sheets

(58) Field of Classification Search
CPC . B25J 9/12; B25J 19/06; B25J 19/0095; B25J 9/1674; G05B 2219/41279; G05B 2219/32234; G05B 2219/40462; G05B 19/406; G05B 19/41865; G05B 19/4184; H02P 3/22

See application file for complete search history.

(56) References Cited

U.S. PATENT DOCUMENTS

| | | | | |
|---|---|---|---|---|
| 6,490,543 | B1* | 12/2002 | Jaw | G07C 3/00 702/184 |
| 6,584,415 | B1* | 6/2003 | Uneme | B23Q 17/0995 702/33 |
| 2009/0089033 | A1* | 4/2009 | Ringering | G05B 19/4065 703/7 |
| 2013/0113411 | A1* | 5/2013 | Suzuki | H02P 23/06 318/681 |
| 2014/0203741 | A1* | 7/2014 | Ohfuchi | H02P 3/12 318/380 |
| 2016/0378076 | A1* | 12/2016 | Hill | G05B 13/026 700/28 |
| 2019/0025813 | A1* | 1/2019 | Cella | G05B 23/0283 |
| 2019/0113576 | A1* | 4/2019 | Saito | G01R 31/42 |
| 2019/0129381 | A1* | 5/2019 | Tanno | G01R 31/58 |
| 2019/0378394 | A1* | 12/2019 | Kawese | G08B 25/08 |
| 2020/0016775 | A1* | 1/2020 | Tagashira | B25J 9/0009 |
| 2020/0225118 | A1* | 7/2020 | Billing | G08B 21/187 |

FOREIGN PATENT DOCUMENTS

| | | | | | |
|---|---|---|---|---|---|
| JP | | 2001186775 A | * | 7/2001 | |
| JP | | 2005-151729 A | | 6/2005 | |
| JP | | 2013070566 A | * | 4/2013 | |
| JP | | 2013-143830 A | | 7/2013 | |
| JP | | 2017-119320 A | | 7/2017 | |
| KR | 10-2011-0039972 A | | | 4/2011 | |
| WO | WO-2017212585 A1 | * | 12/2017 | | H02P 27/06 |

* cited by examiner

ROBOT SYSTEM AND METHOD FOR PREDICTING LIFE OF REGENERATIVE RESISTOR

TECHNICAL FIELD

The present disclosure relates to a robot system and a method for predicting the life of a regenerative resistor, and more particularly, it relates to a robot system including a regenerative resistor that consumes a back electromotive force generated by motor rotation as heat and a method for predicting the life of a regenerative resistor.

BACKGROUND ART

Conventionally, a robot controller that controls a robot is known. Such a robot controller is disclosed in Japanese Patent Laid-Open No. 2000-105605, for example.

Japanese Patent Laid-Open No. 2000-105605 discloses a robot controller that controls a robot with a plurality of motion axes. Motors are provided on the plurality of motion axes of this robot. The robot controller detects the power consumption value and regenerative power value of each of these motors. Furthermore, the robot controller displays a value obtained by dividing the power consumption value that has been consumed so far by a power consumption limit that the motor is expected to consume before the motion axis fails as the degree of deterioration of the motion axis for each motion axis on an output screen. This allows a user to determine the timing of maintenance/inspection of each motion axis of the robot. The robot controller also displays the maximum value of the detected regenerative power value on the output screen. This allows the user to set a regenerative resistance value based on the maximum regenerative power value to design the robot.

PRIOR ART

Patent Document

Patent Document 1: Japanese Patent Laid-Open No. 2000-105605

SUMMARY OF THE INVENTION

In a conventional robot as described in Japanese Patent Laid-Open No. 2000-105605, due to continuous use of a regenerative resistor that consumes a regenerative power (the back electromotive force of a motor) as heat, the regenerative resistor may be damaged (disconnected, for example). In Japanese Patent Laid-Open No. 2000-105605, the robot controller displays the degrees of deterioration of the motion axes on the output screen, and thus the user can determine the timing of maintenance/inspection of each motion axis of the robot. On the other hand, the user cannot determine the timing of maintenance/inspection of the regenerative resistor.

The present disclosure is intended to solve the above problem. The present disclosure aims to provide a robot system and a method for predicting the life of a regenerative resistor each allowing a user to determine the timing of maintenance/inspection of a regenerative resistor.

In order to attain the aforementioned object, a robot system according to a first aspect of the present disclosure includes a robot including a joint, a motor provided at the joint, a regenerative resistor that consumes a back electromotive force generated by rotation of the motor as heat, and a controller configured or programmed to predict a life of the regenerative resistor based on a period of time during which the regenerative resistor is consuming heat.

In the robot system according to the first aspect of the present disclosure, as described above, the controller is configured or programmed to predict the life of the regenerative resistor based on the period of time during which the regenerative resistor is consuming heat. Accordingly, the controller predicts the life of the regenerative resistor based on the period of time during which the regenerative resistor is consuming heat, and thus a user can determine the timing of maintenance/inspection of the regenerative resistor based on the predicted life.

A method for predicting a life of a regenerative resistor according to a second aspect of the present disclosure is a method for predicting a life of a regenerative resistor of a robot system including a robot including a joint, a motor provided at the joint, and the regenerative resistor that consumes a back electromotive force generated by rotation of the motor as heat, and the method includes acquiring a period of time during which the regenerative resistor is consuming heat, and predicting the life of the regenerative resistor based on the acquired period of time during which the regenerative resistor is consuming heat.

As described above, the method for predicting the life of the regenerative resistor according to the second aspect of the present disclosure includes predicting the life of the regenerative resistor based on the acquired period of time during which the regenerative resistor is consuming heat. Accordingly, the life of the regenerative resistor is predicted based on the period of time during which the regenerative resistor is consuming heat, and thus it is possible to provide the method for predicting the life of the regenerative resistor that allows a user to determine the timing of maintenance/inspection of the regenerative resistor based on the predicted life.

According to the present disclosure, as described above, it is possible to determine the timing of maintenance/inspection of the regenerative resistor.

MODES FOR CARRYING OUT THE INVENTION

An embodiment embodying the present disclosure is hereinafter described on the basis of the drawings.

The configuration of a robot system 100 according to this embodiment is now described with reference to FIGS. 1 to 4.

Figure 1:
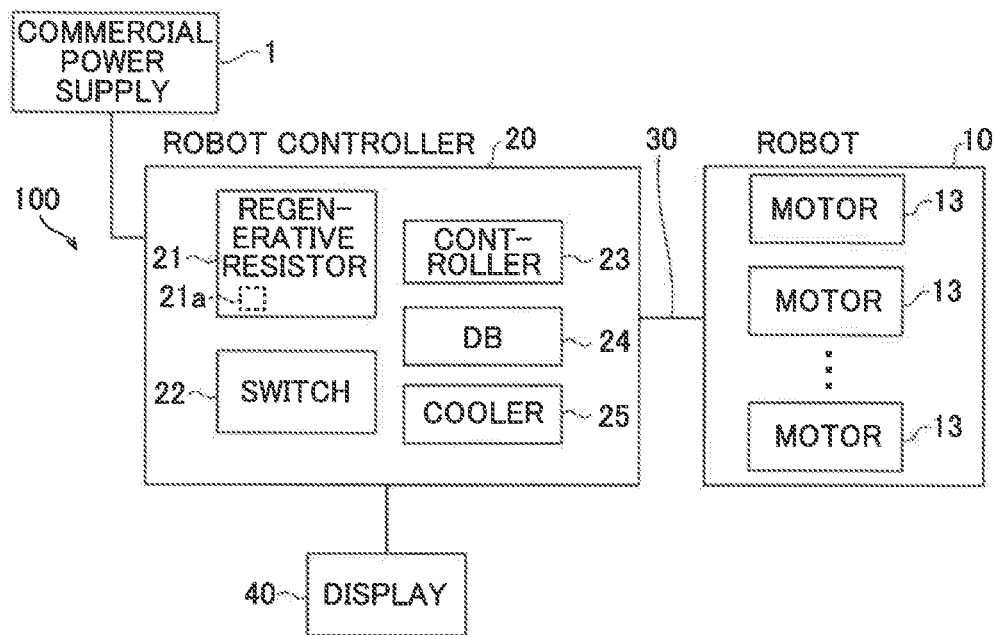
FIG. 1 is a block diagram of a robot system according to an embodiment of the present disclosure.
Figure 2:
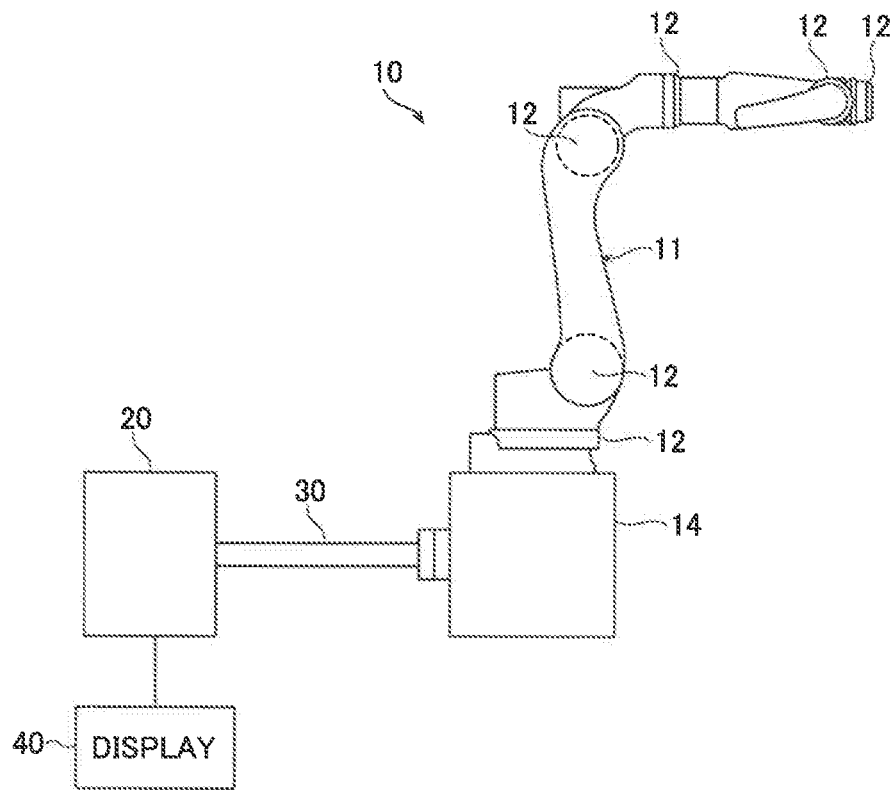
FIG. 2 is a side view of a robot according to the embodiment of the present disclosure.

As shown in FIGS. 1 and 2, the robot system 100 includes a robot 10 and a robot controller 20 provided separately from the robot 10 to control the robot 10. The robot 10 and the robot controller 20 are connected to each other via wiring 30. AC power is supplied from a commercial power supply 1 to the robot controller 20. The robot controller 20 supplies the AC power supplied from the commercial power supply 1 to the robot 10 via the wiring 30 and controls the operation of the robot 10.

As shown in FIG. 2, the robot 10 includes an arm 11. The arm 11 includes joints 12. A plurality of joints 12 are provided. For example, six joints 12 are provided. A motor 13 is provided for each of the joints 12. The arm 11 is attached to a base 14. An end effector (not shown) is attached to the tip end of the arm 11. The robot 10 is an industrial robot 10, for example.

The robot controller 20 converts the AC power supplied from the commercial power supply 1 into DC power with a converter (not shown). The converted DC power is supplied to an inverter (not shown) of the robot 10. The inverter converts the DC power supplied from the robot controller 20 into AC power and supplies the AC power to the motors 13. Furthermore, the inverter converts back electromotive forces generated by rotation of the motors 13 into DC power and supplies the DC power to the converter of the robot controller 20.

In this embodiment, as shown in FIG. 1, the robot system 100 includes a regenerative resistor 21 that consumes the back electromotive forces generated by rotation of the motors 13 as heat. The regenerative resistor 21 is provided in the robot controller 20. The regenerative resistor 21 consumes, as heat, back electromotive forces (regenerative energy) generated when the motors 13 decelerate, for example. Thus, an increase in a voltage in a path (such as the wiring 30) between the motors 13 and the robot controller 20 is reduced or prevented.

In this embodiment, the regenerative resistor 21 provided in the robot controller 20 is provided in common for a plurality of motors 13. That is, the common regenerative resistor 21 consumes the back electromotive forces generated from the plurality of motors 13 as heat.

The regenerative resistor 21 includes a winding plate (not shown) and a resistance wire (not shown) wound around the winding plate. An insulating plate (not shown) is provided around the resistance wire. The back electromotive forces are supplied to the resistance wire such that the temperature of the resistance wire rises. The back electromotive forces are intermittently supplied to the resistance wire such that the resistance wire repeats expansion and contraction. The resistance wire is damaged (disconnected) due to interference with the winding plate caused by the repeated expansion and contraction.

Figure 3:
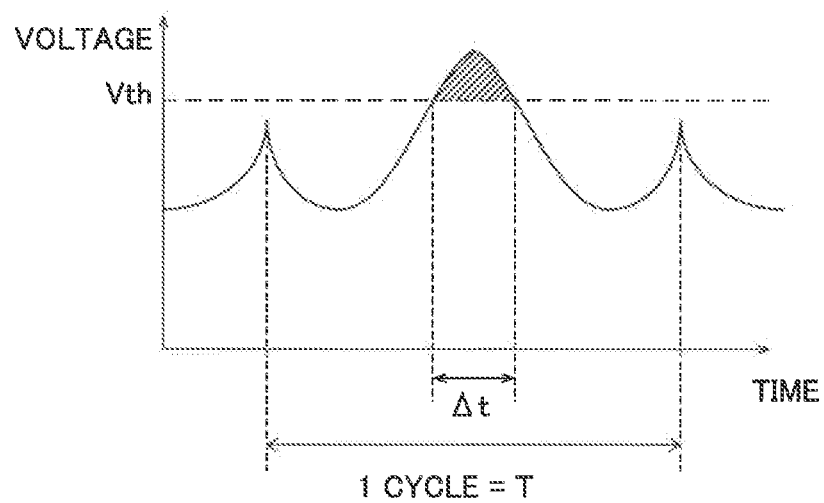
FIG. 3 is a diagram showing a back electromotive force generated by motor rotation.

As shown in FIG. 3, back electromotive forces are generated by rotation of the motors 13 of the joints 12 accompanying the operation of the robot 10. The magnitude of the back electromotive forces (voltage) generated by rotation of the motors 13 varies depending on the operation of the robot 10. When the back electromotive forces (voltage) generated by rotation of the motors 13 exceed a threshold voltage Vth (a hatched area in FIG. 3), the regenerative resistor 21 consumes the back electromotive forces as heat.

Specifically, when the back electromotive forces (voltage) generated by rotation of the motors 13 exceed the threshold voltage Vth, a switch 22 (see FIG. 1) connected to the regenerative resistor 21 is turned on such that the back electromotive forces energize the regenerative resistor 21. Thus, the resistance wire of the regenerative resistor 21 consumes the back electromotive forces as heat. When the back electromotive forces (voltage) generated by rotation of the motors 13 are equal to or lower than the threshold voltage Vth, the back electromotive forces are regenerated to a power storage (not shown) or the like.

In this embodiment, as shown in FIG. 1, the robot system 100 includes a controller 23 that predicts the life of the regenerative resistor 21 based on a period of time during which the regenerative resistor 21 is consuming heat. The controller 23 is provided in the robot controller 20 in which the common regenerative resistor 21 is provided for the plurality of motors 13. The controller 23 includes an arithmetic unit such as a microcontroller, a central processing unit (CPU), a microprocessor (MPU), a logic circuit, or a programmable logic controller (PLC) and storages such as a read-only memory (ROM) and a random access memory (RAM), for example. The life of the regenerative resistor 21 refers to the time it takes for the regenerative resistor 21 to break. The life of the regenerative resistor 21 may be represented by the number of times the back electromotive forces energize the regenerative resistor 21.

In this embodiment, as shown in FIG. 3, the controller 23 predicts the life of the regenerative resistor 21 based on the proportion of the period of time during which the regenerative resistor 21 is consuming heat within a predetermined unit period. The predetermined unit time refers to one cycle (T) of the operation of the robot 10. In one cycle of the operation of the robot 10, the proportion of the period of time during which the regenerative resistor 21 is consuming heat (a period of time $\Delta t$ during which the voltages of the back electromotive forces of the motors 13 exceed a threshold voltage Vth) is about 3% to about 4%, for example. The controller 23 predicts the life of the regenerative resistor 21 by monitoring the proportion of the period of time ($\Delta t$) during which the regenerative resistor 21 is consuming heat in one cycle.

The life of the regenerative resistor 21 varies depending on conditions such as the material and length of the resistance wire of the regenerative resistor 21, and the presence of a member (winding plate described above) that interfere with the resistance wire, and thus it is relatively difficult to find the life of the regenerative resistor 21 using a mathematical formula or the like. That is, the degree of temperature rise of the resistance wire due to the energization of the regenerative resistor 21 by the back electromotive forces varies depending on the material, length, cross-sectional area, etc. of the resistance wire. Similarly, the degree of expansion and contraction of the resistance wire varies depending on a coefficient of thermal expansion inherent to the resistance wire. The degree of temperature rise of the resistance wire and the degree of expansion and contraction of the resistance wire also vary depending on an environmental temperature around the resistance wire.

Therefore, as shown in FIG. 1, a database (DB) 24 is created in which the life of the regenerative resistor 21 has been obtained in advance through an experiment or the like, taking into consideration the period of time during which the regenerative resistor 21 is consuming heat under various conditions. In the database 24, the period of time during which the regenerative resistor 21 is consuming and the life of the regenerative resistor 21 are associated with each other. The database 24 is provided in the robot controller 20.

In this embodiment, the controller 23 predicts the life of the regenerative resistor 21 based on the database 24 of the life of the regenerative resistor 21 that has been obtained in advance, taking into consideration the period of time during which the regenerative resistor 21 is consuming heat. That is, the controller 23 acquires the life of the regenerative resistor 21 associated with the period of time during which the regenerative resistor 21 is consuming heat, referring to the database 24.

In this embodiment, the robot system 100 also includes a display 40 that displays the life of the regenerative resistor 21 predicted by the controller 23. The display 40 includes a liquid crystal monitor, for example, provided separately from the robot 10 and the robot controller 20. The display 40 is provided on a teaching pendant that teaches the robot 10 how to operate, for example.

Figure 4:
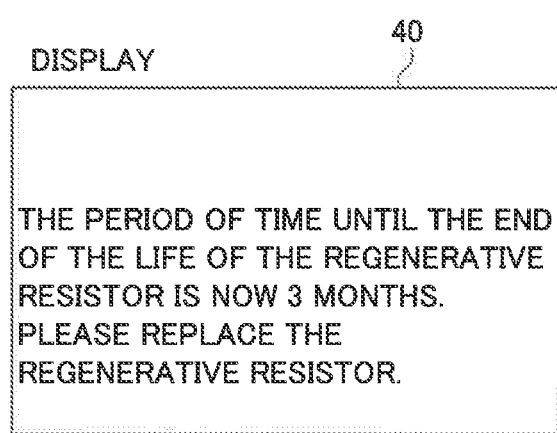
FIG. 4 is a diagram of a display showing that the life of a regenerative resistor is within a predetermined period of time.

In this embodiment, as shown in FIG. 4, the controller 23 displays, on the display 40, that the life of the regenerative resistor 21 is within a predetermined period when a period of time until the end of the life of the regenerative resistor 21 becomes within the predetermined period. For example, the predetermined period is a sufficient period of time (such as three months) to replace the regenerative resistor 21. The controller 23 predicts the life of the regenerative resistor 21 based on the period of time during which the regenerative resistor 21 is consuming heat, and causes the display 40 to display messages for warning a user, such as "THE LIFE OF THE REGENERATIVE RESISTOR IS NOW 3 MONTHS." and "PLEASE REPLACE THE REGENERATIVE RESISTOR.", when the life of the regenerative resistor 21 becomes within the predetermined period.

In this embodiment, as shown in FIG. 1, the robot system 100 includes a cooler 25 that cools the regenerative resistor 21. The controller 23 detects a failure of the cooler 25 based on the period of time during which the regenerative resistor 21 is consuming heat and the temperature of the regenerative resistor 21. The cooler 25 includes a cooling fan, for example. The regenerative resistor 21 includes a temperature sensor 21a to measure the temperature of the resistance wire. When the cooler 25 is normal, the cooler 25 lowers the temperature of the regenerative resistor 21 by a predetermined degree with respect to the period of time during which the regenerative resistor 21 is consuming heat. On the other hand, when the cooler 25 fails, the degree of decrease in the temperature of the regenerative resistor 21 is small with respect to the period of time during which the regenerative resistor 21 is consuming heat.

For example, when blades of the cooling fan fail (break, for example), the cooling capacity drops even when the cooling fan rotates normally. In this case, it is determined that the cooling fan is normal even when an abnormality of the cooling fan is to be detected based on the number of rotations of the cooling fan. Therefore, the controller 23 detects that the degree of decrease in the temperature of the regenerative resistor 21 is small with respect to the period of time during which the regenerative resistor 21 is consuming heat such that the cooler 25 can detect the failure.

Method for Predicting Life of Regenerative Resistor

Figure 5:
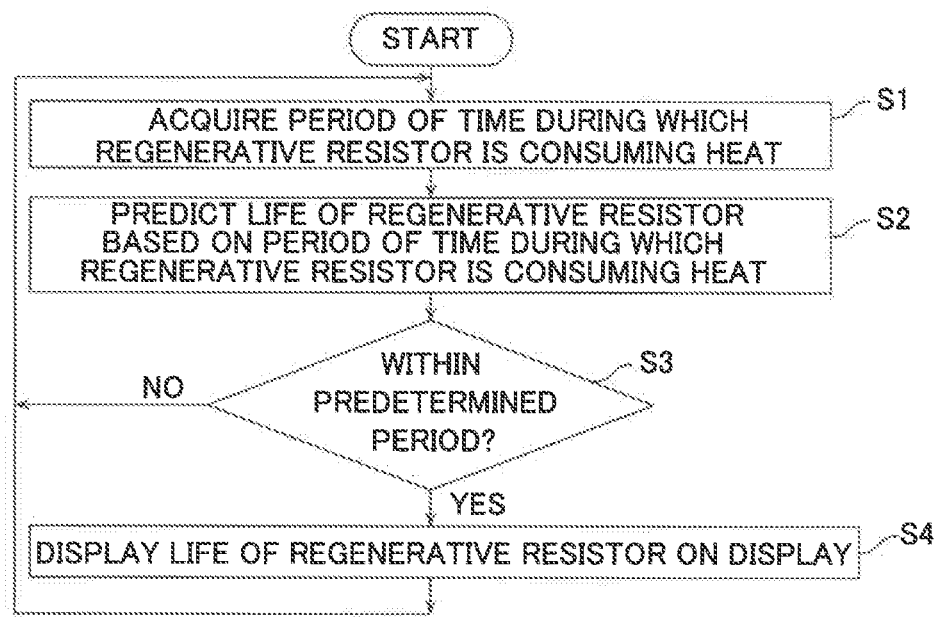
FIG. 5 is a flowchart illustrating a method for predicting the life of the regenerative resistor according to the embodiment of the present disclosure.

A method for predicting the life of the regenerative resistor 21 is now described with reference to FIG. 5. Prediction of the life of the regenerative resistor 21 is continuously performed while the robot system 100 is operating.

First, in step S1, the controller 23 acquires the period of time during which the regenerative resistor 21 is consuming heat. Specifically, the controller 23 acquires the period of time during which the regenerative resistor 21 is consuming heat based on the proportion of a period of time during which the switch 22 connected to the regenerative resistor 21 is on in one cycle of the operation of the robot 10.

Then, in step S2, the controller 23 predicts the life of the regenerative resistor 21 based on the acquired period of time during which the regenerative resistor 21 is consuming heat. Specifically, the controller 23 acquires the life of the regenerative resistor 21 associated with the period of time during which the regenerative resistor 21 is consuming heat, referring to the database 24.

Then, in step S3, the controller 23 determines whether or not the period of time until the end of the acquired life of the regenerative resistor 21 is within the predetermined period (three months, for example).

In the case of yes in step S3, the controller 23 causes the display 40 to display the life of the regenerative resistor 21 (that the period of time until the end of the acquired life of the regenerative resistor 21 is within the predetermined period) in step S4. In the case of no in step S3, the process returns to step S1.

Advantages of this Embodiment

According to this embodiment, the following advantages are achieved.

Advantages of Robot System

According to this embodiment, as described above, the controller 23 is configured or programmed to predict the life of the regenerative resistor 21 based on the period of time during which the regenerative resistor 21 is consuming heat. Accordingly, the controller 23 predicts the life of the regenerative resistor 21 based on the period of time during which the regenerative resistor 21 is consuming heat, and thus the user can determine the timing of maintenance/inspection of the regenerative resistor 21 based on the predicted life.

According to this embodiment, as described above, the controller 23 is configured or programmed to predict the life of the regenerative resistor 21 based on the proportion of the period of time during which the regenerative resistor 21 is consuming heat within the predetermined unit period. The robot system 100 frequently repeats the same operation within the predetermined unit period (one cycle), and thus with the configuration as described above, in the robot system 100 that repeats the same operation, the life can be appropriately predicted.

According to this embodiment, as described above, the robot system 100 includes the display 40 to display the life of the regenerative resistor 21 predicted by the controller 23. Accordingly, the life of the regenerative resistor 21 predicted by the controller 23 is displayed on the display 40, and thus the user can easily recognize the life of the regenerative resistor 21 by viewing the display on the display 40.

According to this embodiment, as described above, the controller 23 is configured or programmed to display, on the display 40, that the period of time until the end of the life of the regenerative resistor 21 is within the predetermined period when the period of time until the end of the life of the regenerative resistor 21 becomes within the predetermined period. Accordingly, a sufficient period of time to replace the regenerative resistor 21 is set as the predetermined period such that the user can replace the regenerative resistor 21 in good time before the end of the life of the regenerative resistor 21.

According to this embodiment, as described above, the robot 10 includes the plurality of joints 12, the motor 13 is provided for each of the plurality of joints 12, and the regenerative resistor 21 is provided in common for the plurality of motors 13. The regenerative resistor 21 is provided in common for the plurality of motors 13, and thus the regenerative resistor 21 relatively frequently consumes heat. Therefore, predicting the life of the regenerative resistor 21 provided in common for the plurality of motors 13 is particularly effective in terms of replacing the regenerative resistor 21 before it is damaged.

According to this embodiment, as described above, the robot system 100 includes the robot controller 20 provided separately from the robot 10 and configured or programmed to control the robot 10. Furthermore, the regenerative resistor 21 provided in common for the plurality of motors 13 and the controller 23 are provided in the robot controller 20. Accordingly, in the robot system 100 in which the regenerative resistor 21 is provided in the robot controller 20, the timing of maintenance/inspection of the regenerative resistor 21 can be easily determined.

According to this embodiment, as described above, the robot system 100 includes the cooler 25 to cool the regenerative resistor 21. Furthermore, the controller 23 is configured or programmed to detect a failure of the cooler 25 based on the period of time during which the regenerative resistor 21 is consuming heat and the temperature of the regenerative resistor 21. Accordingly, the failure of the cooler 25 can be appropriately detected based on the period of time during which the regenerative resistor 21 is consuming heat and the temperature of the regenerative resistor 21.

According to this embodiment, as described above, the controller 23 is configured or programmed to predict the life of the regenerative resistor 21 based on the database 24 of the life of the regenerative resistor 21 that has been obtained in advance, taking into consideration the period of time during which the regenerative resistor 21 is consuming heat. Accordingly, the life of the regenerative resistor 21 is predicted based on the database 24 in which the life of the regenerative resistor 21 has been obtained in advance through an experiment or the like, taking into consideration the period of time during which the regenerative resistor 21 is consuming heat under various conditions such that the life of the regenerative resistor 21 is appropriately predicted according to the conditions.

Advantages of Method for Predicting Life of Regenerative Resistor

According to this embodiment, as described above, the method for predicting the life of the regenerative resistor 21 includes step S2 of predicting the life of the regenerative resistor 21 based on the acquired period of time during which the regenerative resistor 21 is consuming heat. Accordingly, the life of the regenerative resistor 21 is predicted based on the period of time during which the regenerative resistor 21 is consuming heat, and thus it is possible to provide the method for predicting the life of the regenerative resistor 21 that allows the user to determine the timing of maintenance/inspection of the regenerative resistor 21 based on the predicted life.

Modified Examples

The embodiment disclosed this time must be considered as illustrative in all points and not restrictive. The scope of the present disclosure is not shown by the above description of the embodiment but by the scope of claims for patent, and all modifications (modified examples) within the meaning and scope equivalent to the scope of claims for patent are further included.

For example, while the example in which the present disclosure is applied to the industrial robot 10 has been shown in the aforementioned embodiment, the present disclosure is not limited to this. For example, the present disclosure may be applied to a non-industrial robot.

While the example in which the life of the regenerative resistor 21 is predicted based on the proportion of the period of time during which the regenerative resistor 21 is consuming heat in one cycle of the operation of the robot 10 has been shown in the aforementioned embodiment, the present disclosure is not limited to this. For example, the life of the regenerative resistor 21 may be predicted based on the proportion of the period of time during which the regenerative resistor 21 is consuming heat in one day.

While the example in which the display 40 displays that the life of the regenerative resistor 21 is within the predetermined period when the period of time until the end of the life of the regenerative resistor 21 becomes within the predetermined period has been shown in the aforementioned embodiment, the present disclosure is not limited to this. For example, the life of the regenerative resistor 21 predicted by the controller 23 may constantly be displayed on the display 40 regardless of whether the period of time until the end of the life is within the predetermined period.

While the example in which the display 40 displays that the life of the regenerative resistor 21 is within the predetermined period when the period of time until the end of the life of the regenerative resistor 21 becomes within the predetermined period has been shown in the aforementioned embodiment, the present disclosure is not limited to this. For example, an alarm or the like may be used to notify the user that the period of time until the end of the life of the regenerative resistor 21 is within the predetermined period.

While the example in which the regenerative resistor 21 is provided in common for the plurality of motors 13 respectively provided for the plurality of joints 12 of the robot 10 has been shown in the aforementioned embodiment, the present disclosure is not limited to this. For example, the regenerative resistor 21 may be provided individually for the plurality of motors 13.

While the example in which the regenerative resistor 21 is provided in the robot controller 20 has been shown in the aforementioned embodiment, the present disclosure is not limited to this. For example, the regenerative resistor 21 may be provided in a portion other than the robot controller 20.

While the example in which the controller 23 predicts the life of the regenerative resistor 21 based on the database 24 of the life of the regenerative resistor 21 that has been obtained in advance, taking into consideration the period of time during which the regenerative resistor 21 is consuming heat has been shown in the aforementioned embodiment, the present disclosure is not limited to this. For example, the controller 23 may predict (calculate) the life of the regenerative resistor 21 using the period of time during which the regenerative resistor 21 is consuming heat and a calculation formula for calculating the life of the regenerative resistor 21.

While the example in which the controller 23 predicts the life of the regenerative resistor 21 based on the period of time during which the regenerative resistor 21 is consuming heat has been shown in the aforementioned embodiment, the present disclosure is not limited to this. For example, the controller 23 may predict the life of the regenerative resistor 21 based on the period of time during which the regenerative resistor 21 is consuming heat and the frequency of heat consumption of the regenerative resistor 21. In this case, the database 24 is created taking into consideration the frequency of heat consumption of the regenerative resistor 21 (the number of times of heat consumption during a predetermined period). When the heat consumption of the regenerative resistor 21 is concentrated in a short period of time, the life of the regenerative resistor 21 is shortened. Therefore, the controller 23 predicts the life of the regenerative resistor 21 based on the frequency of heat consumption of the regenerative resistor 21 in addition to the period of time during which the regenerative resistor 21 is consuming heat such that the life of the regenerative resistor 21 can be more appropriately predicted.

DESCRIPTION OF REFERENCE NUMERALS

10: robot
12: joint
13: motor
20: robot controller
21: regenerative resistor
23: controller
24: database
25: cooler
40: display
100: robot system

The invention claimed is:

1. A robot system comprising:
a robot including a joint;
a motor provided at the joint;
a regenerative resistor that consumes a back electromotive force generated by rotation of the motor as heat;
a memory storing a database in which life values representing a remaining life of the regenerative resistor are associated with respective proportion values representing a proportion of time during which the regenerative resistor has consumed heat, the values having been stored in advance; and
a controller configured or programmed to:
acquire a period of time during which the regenerative resistor is consuming heat within one operational cycle of the robot;
based on the acquired period of time, determine a proportion of the time of the one operational cycle that the regenerative resistor is consuming heat;
compare the determined proportion to the proportion values in the database to determine the remaining life of the regenerative resistor; and
output the determined remaining life of the regenerative resistor.

2. The robot system according to claim 1, further comprising:
a display to display the output determined remaining life of the regenerative resistor.

3. The robot system according to claim 2, wherein the controller is configured or programmed to display, on the display, that the determined remaining life is within a predetermined period.

4. The robot system according to claim 1, wherein
the robot includes a plurality of the joints;
the motor is provided for each of the plurality of joints; and
the regenerative resistor is provided in common for a plurality of the motors.

5. The robot system according to claim 4, further comprising:
a robot controller provided separately from the robot and configured or programmed to control the robot; wherein
the regenerative resistor provided in common for the plurality of motors and the controller are provided in the robot controller.

6. The robot system according to claim 1, further comprising:
a cooler to cool the regenerative resistor; wherein
the controller is configured or programmed to detect a failure of the cooler based on the determined proportion of the time of the operational cycle that the regenerative resistor is consuming heat and a temperature of the regenerative resistor.

7. The robot system according to claim 1, wherein the controller is configured or programmed to predict the life of the regenerative resistor based on the determined proportion of the time of the operational cycle that the regenerative resistor is consuming heat and a frequency of heat consumption of the regenerative resistor.

8. A method for predicting a life of a regenerative resistor of a robot system including a robot including a joint, a motor provided at the joint, the regenerative resistor that consumes a back electromotive force generated by rotation of the motor as heat, and a memory storing a database in which life values representing a remaining life of the regenerative resistor are associated with respective proportion values representing a proportion of time during which the regenerative resistor has consumed heat, the values having been stored in advance the method comprising:
acquiring a period of time during which the regenerative resistor is consuming heat within one operational cycle of the robot; and
based on the acquired period of time, determining a proportion of the time of the one operational cycle that the regenerative resistor is consuming heat;
comparing the determined proportion to the proportion values in the database to determine the remaining life of the regenerative resistor; and
outputting the determined remaining life of the regenerative resistor.

* * * * *